United States Patent Office 3,062,843
Patented Nov. 6, 1962

3,062,843
C-2-CARBOXYLIC ACID AND C-2-HYDROXY-METHYL DERIVATIVES OF THE ANDROSTANE SERIES
Lawrence H. Knox, Mexico City, Mexico, assignor, by mesne assignments, to Syntex Corporation, a corporation of Panama
No Drawing. Filed Jan. 4, 1961, Ser. No. 80,527
Claims priority, application Mexico Jan. 6, 1960
31 Claims. (Cl. 260—397.1)

The present invention relates to novel cyclopentanophenanthrene compounds and to a method for the production thereof.

More particularly the present invention relates to C-2 carboxylic acid and C-2-hydroxymethyl derivatives of the androstane series and more specifically of androstanes having keto or hydroxyl groups at C-3 and C-17, which may also contain an alkyl group at C-17α, to 19-nor-derivatives thereof as well as esters thereof.

The novel compounds of the present invention which are valuable anabolic agents having a favorable anabolic-androgenic ratio and which exhibit anti-estrogenic activity, influence the secretion of the gonadotrophic hormone of the pituitary gland and lower the cholesterol level are represented by the following formulas:

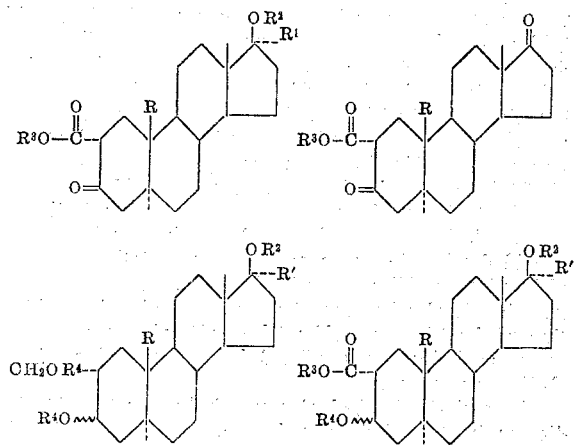

In the above formulas, R represents hydrogen or methyl, R' and R³ represent hydrogen or an alkyl radical containing 1 to 5 carbon atoms, such as methyl, ethyl, propyl, R² and R⁴ represent hydrogen or the acyl radical of a hydrocarbon carboxylic acid of less than 12 carbon atoms which may be saturated or unsaturated, of straight, branched, cyclic or cyclic-aliphatic chain and may be substituted with functional groups such as hydroxy, acyloxy, alkoxy, amino, nitro or halogen. Typical ester groups are the acetate, propionate, butyrate, caproate, hemisuccinate, benzoate, aminoacetate, cyclopentylpropionate, trimethylacetate and β-chloropropionate.

The novel compounds of the present invention are prepared by reducing a 2α-hydroxymethyl-dihydroallo-testosterone to form a 2α-hydroxymethyl-androstane-3,17-diol or by oxidizing a 2α-hydroxymethyl-dihydroallotes-tosterone to form 2-carboxy-androstane-3,17-dione or a 2α-carboxy-androstane-17β-ol-3-one which may then be subjected to reduction to produce the 3,17-diol.

The preparation of the novel compounds of the present invention is illustrated in part by the following equation:

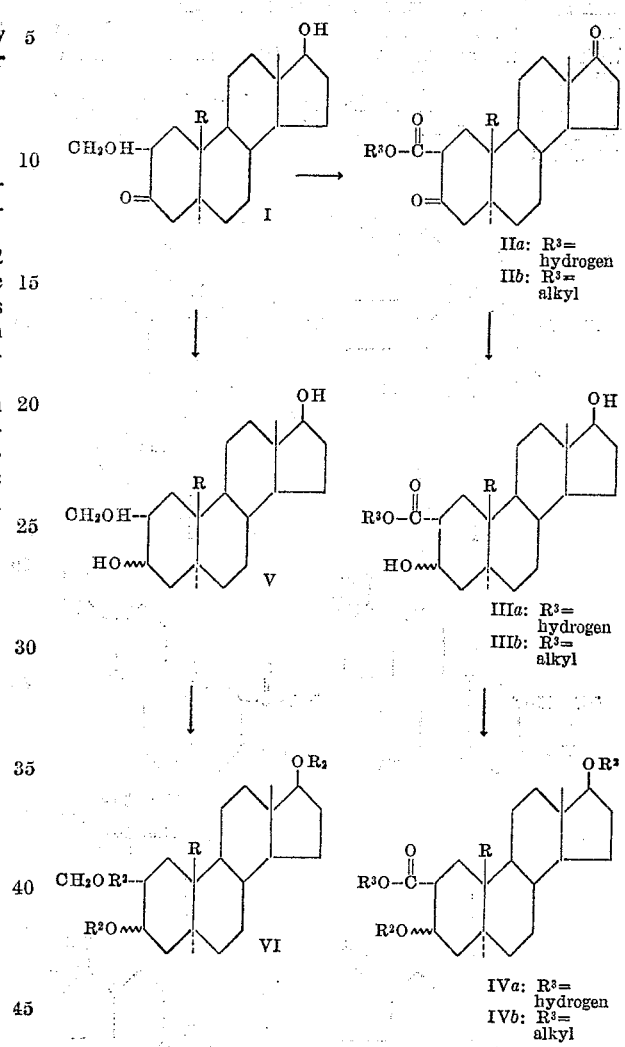

In the above formulas R, R² and R³ have the same meaning as previously set forth.

In practicing the process outlined above the starting compound 2α-hydroxymethyl-dihydroallotestosterone or 2α-hydroxymethyl-19-nor-dihydroallotestosterone (I) prepared by hydrogenation of the corresponding 2-hydroxymethylene derivative as more fully described in copending application Serial No. 80,528, filed January 4, 1961, now Patent No. 3,000,912, is subjected to oxidation, preferably in acetone solution at low temperature with a solution of 8 N chromic acid prepared in dilute sulfuric acid. Alternatively the chromic oxide-pyridine complex may be employed as the oxidizing agent to form 2α-carboxy-androstane-3,17-dione or 2α-carboxy-19-nor-androstane-3,17-dione (IIa). The latter can then be esterified by reaction with a diazoalkane such as diazomethane, diazoethane or other diazoalkanes containing up to 5 carbon atoms to form the carboalkoxy derivative (IIb). Upon treatment of the 2α-carboxy (IIa) or a 2α-carboalkoxy (IIb) compound with a reducing agent such as sodium borohydride, there is formed a mixture of the corresponding 3α,17β and 3β,17β-diols (IIIa and IIIb). Conventional esterification of the latter products with hydrocarbon carboxylic acid anhydrides of the type mentioned previously results in the formation of the corresponding 3,17-diesters (IVa and IVb).

The treatment of 2α-hydroxymethyl-dihydroallotestosterone or 2α-hydroxymethyl-19-nor-dihydroallotestosterone (I) with lithium aluminum hydride leads to the formation of the corresponding 2α-hydroxymethylandrostan-3,17β-diol (V) with the 3β-isomer as the main product. Conventional esterification of the latter with the hydrocarbon carboxylic acids described hereinabove affords the triesters (VI).

In another aspect of the present invention the novel compounds may be prepared in part by the following equation:

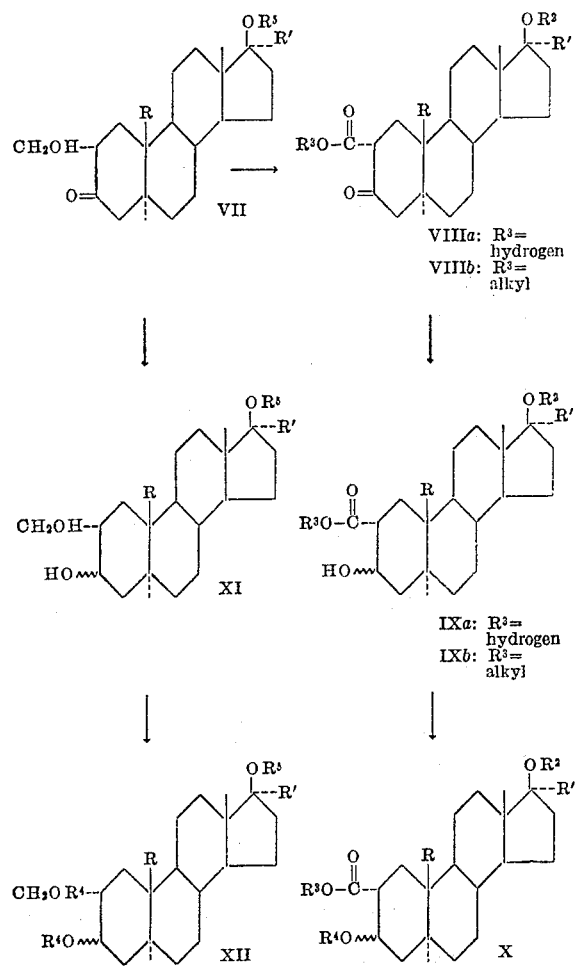

VIIIa: R³=hydrogen
VIIIb: R³=alkyl

IXa: R³=hydrogen
IXb: R³=alkyl

In the above formulas R, R', R², R³ and R⁴ have the same meaning as previously set forth. R⁵ represents the acyl group of a hydrocarbon carboxylic acid of the type mentioned previously when R' is hydrogen and represents hydrogen or the acyl group of a hydrocarbon carboxylic acid when R' is alkyl.

In practicing the process outlined above, the starting compound, the 17α-ester of 2α-hydroxymethyl-dihydroallotestosterone or of 19-nor-dihydroallotestosterone or the 17α-alkyl derivative of the free compound or of the 17β-ester (VII) prepared by hydrogenation of the corresponding 2-hydroxymethylene compound as set forth in copending application Serial No. 80,528, filed January 4, 1961, now Patent No. 3,000,912, is subjected to oxidation preferably in acetone solution at low temperature with 8 N chromic acid prepared in dilute sulfuric acid.

Alternatively there may be employed the chromic oxide-pyridine complex as the oxidizing agent to form the 2α-carboxy derivative (VIIIa). Thus a 17-ester of 2α-hydroxymethyl-dihydroallotestosterone or the 17α-alkyl derivative of 2α-hydromethyl dihydroallotestosterone or the ester thereof (VII) affords the corresponding 17-ester of 2α-carboxy-dihydroallotestosterone or 2α-carboxy-17α-alkyl - dihydroallotestosterone or the 17β - ester thereof (VIIIa). The ester group at C-17β, if present, can be saponified to afford the free alcohol (R²=hydrogen) which can be esterified with another hydrocarbon carboxylic acid anhydride or chloride of the type mentioned previously. The 2α-carboxy compounds can then be esterified as by reaction with a diazoalkane to form the carboalkoxy derivative (VIIIb).

Upon treatment of the 2α-carboxy (VIIIa) or 2α-carboalkoxy compound (VIIIb) with sodium borohydride as described previously, there is formed a mixture of the corresponding 3α and 3β hydroxy compounds (IXa and IXb).

Upon conventional esterification of the 3,17-diols (IXa or IXb: R²=hydrogen) with hydrocarbon carboxylic acid anhydrides of the type described previously, there is formed the corresponding C-3,17-diesters (X) when R' is hydrogen or the C-3 monoesters when R' is alkyl. For formation of the diesters of C-3,17-diols when R' is alkyl, the esterification is effected in the presence of an acid catalyst such as p-toluenesulfonic acid and an inert solvent such as benzene. Esterification of the C-3 hydroxy group of the 17β-esters (IXa or IXb: R²=acyl) may be effected by conventional methods with the same or different acylating agent to afford the C-3,17-diesters (X) having the same or different ester groups.

The treatment of 2α-hydroxymethyl-dihydroallotestosterone, the 17α-alkyl derivative or the esters thereof, as well as the corresponding 19-nor compounds (VII) with lithium aluminum hydride forms the corresponding 3-hydroxy compound with the 3β-form as the main product (XI). Conventional esterification with hydrocarbon carboxylic acid anhydrides as described previously results in esterification of the primary and secondary hydroxyl groups. Esterification of a tertiary hydroxyl group at C-17β is effected in the presence of an acid catalyst as described above. Thus there can be produced diesters (XII: R⁵=hydrogen; R'=alkyl) which may be further esterified with the same or different acylating agent to yield triesters (XII: R⁴ and R⁵=acyl). The latter compounds can also be formed upon conventional esterification of the 17β-esters (XI: R⁵=acyl) with same or different acylating agent utilized in the formation of the C–17β ester group.

Alternatively the 2α-hydroxymethyl-androstane-3β,17β-diol or the 17α-alkyl derivative thereof (XI) may be obtained by treating 2-hydroxymethylene-dihydroallotestosterone or 2-hydroxymethylene-17α-lower alkyl-dihydroallotestosterone with lithium aluminum hydride in the same manner as set forth previously.

There may also be produced the valuable anabolic agents, 2α-lower alkoxymethyl-androstane-3,17β-diols or the 17α-lower alkyl derivatives thereof by reacting 2α-lower alkoxymethyl dihydroallotestosterone or 2α-lower alkoxymethyl-17α-lower alkyl-dihydroallotestosterone, described in copending application Serial No. 80,528, filed January 4, 1961, now Patent No. 3,000,912, with lithium aluminum hydride.

The following examples serve to illustrate but are not intended to limit the scope of the invention:

*Example 1*

1 g. of 2α-hydroxymethyl-androstan-17β-ol-3-one dissolved in 25 cc. of acetone was cooled to 0° C.; the air in the container was substituted by nitrogen and there was added a solution of 8 N chromic acid, at 0° C., under an atmosphere of nitrogen, with stirring and until the reddish color of chromium trioxide persisted. (The solution of 8 N chromic acid had been prepared by dissolving 26.7 g. of chromium trioxide in 23 cc. of concentrated sulfuric acid, diluting with water to 100 cc.). The mixture was stirred at 0° C. for approximately 10 minutes more, then poured into ice water; the solid was filtered, washed with water, dried and recrystallized from acetone. Thus there was obtained the 3,17-diketo-androstan-2α-carboxylic acid, M.P. 172–175° C.

*Example II*

To a solution of 3.2 g. (0.01 mol) of 3,17-diketo-androstan-2α-carboxylic acid in 75 cc. of methanol was added dropwise with stirring in 30 minutes a solution of 0.20 g. (0.005 mol) of sodium borohydride in a mixture of 30 cc. of methanol and 0.6 cc. of water. After 1 hour, the mixture containing the isomeric 3α,17β and 3β,17β-dihydroxy-androstane-2α-carboxylic acids was precipitated in cold water, the product collected on a filter, washed to neutrality, dried and crystallized from methanol, affording pure 3β,17β-dihydroxy-androstane-2α-carboxylic acid.

*Example III*

According to the method of Example I, 1 g. of 3,17-diketo-androstane-2α-carboxylic acid was prepared and treated in ether with 60 cc. of an ether solution of diazomethane, prepared from 1.6 g. of nitrosomethylurea. The solution of diazomethane was added with stirring and within a few minutes. It was kept for 15 minutes at room temperature, acidified by addition of acetic acid and the liquid was evaporated at reduced pressure. The residue was purified by recrystallization from acetone-hexane to afford the methyl ester of 3,17-diketo-androstane-2α-carboxylic acid.

*Example IV*

Following the method of the foregoing example but employing diazoethane instead of diazomethane, there was obtained the ethyl ester of 3,17-diketo-androstane-2-carboxylic acid.

*Example V*

1 g. of 2α-hydroxymethyl-19-nor-androstan-17β-ol-3-one dissolved in 25 cc. of acetone was cooled to 0° C.; the air in the container was substituted by nitrogen and there was added a solution of 8 N chromic acid, at 0° C., under an atmosphere of nitrogen, with stirring and until the reddish color of chromium trioxide persisted. (The solution of 8 N chromic acid had been prepared by dissolving 26.7 g. of chromium trioxide in 23 cc. of concentrated sulfuric acid, diluting with water to 100 cc.) The mixture was stirred at 0° C. for approximately 10 minutes more, then poured into ice water; the solid was filtered, washed with water, dried and recrystallized from acetone. Thus there was obtained the 3,17-diketo-19-nor-androstane-2α-carboxylic acid.

*Example VI*

According to the method of Example V, 1 g. of 3,17-diketo-19-nor-androstane-2α-carboxylic acid was prepared and treated in 10 cc. of ether with 60 cc. of an ether solution of diazomethane, prepared from 1.6 g. of nitrosomethylurea. The solution of diazomethane was added with stirring and within a few minutes. It was kept for 15 minutes at room temperature, acidified by addition of acetic acid and the liquid was evaporated at reduced pressure. The residue was purified by recrystallization from acetone-hexane to afford the methyl ester of 3,17-diketo-19-nor-androstane-2α-carboxylic acid.

*Example VII*

Following the method of the foregoing example but employing diazoethane instead of diazomethane, there was obtained the ethyl ester of 3,17-diketo-19-nor-androstane-2α-carboxylic acid.

*Example VIII*

2 g. of 2α-hydroxymethyl-17α-acetoxy-androstan-3-one was dissolved in 50 cc. of acetone; the solution was cooled to 0° C., and the air in the container was substituted by nitrogen. Then there was added little by little a solution of 8 N chromic acid prepared from 26.7 g. of chromium trioxide and diluted sulfuric acid little by little and with stirring at 0° C. under an atmosphere of nitrogen, until the reddish color of chromium trioxide persisted; it was then stirred under the same conditions for some minutes further and finally poured into ice water. The solid was filtered, washed with water, dried and recrystallized from acetone. Thus there was obtained 3-keto-17β-acetoxy-androstane-2α-carboxylic acid.

*Example IX*

Exactly as described in Example VIII, the 2α-hydroxymethyl derivatives of 17β-propionoxy-androstan-3-one, of 17β-capronoxy-androstan-3-one and of 17β-cyclopentyl propionoxy-androstan-3-one were oxidized to afford the 2α-carboxylic derivatives of the aforementioned steroids.

*Example X*

Exactly as described in Example VIII, there were oxidized the 2α-hydroxymethyl derivatives of 17α-methyl-androstan-17β-ol-3-one, of 17α-ethyl-androstan-17β-ol-3-one, as well as the 17-esters of said compounds, more specifically the acetates, propionates, caproates and cyclopentylpropionates. Thus there were obtained the 17α-methyl 3-keto-17β-hydroxy-androstane-2α-carboxylic and the 17α-ethyl-3-keto-17β-hydroxy-androstane-2α-carboxylic acids as well as the 17-acetate, 17-propionate, 17-caproate and 17-cyclopentylpropionate of said acids.

*Example XI*

To a solution of 3.5 g. (0.01 mol) of 17α-methyl-3-keto-17β-hydroxy-androstane-2α-carboxylic acid prepared in accordance with the method described in the preceding example, in 75 cc. of methanol, was added dropwise with stirring in 30 minutes a solution of 0.10 g. (0.0025 mol) of sodium borohydride in a mixture of 15 cc. of methanol and 0.3 cc. of water. After one hour, the mixture was precipitated in cold water, filtered, washed to neutrality and dried. The crude mixture of 17α-methylandrostane-3α,17β-diol-2α-carboxylic acid and of 17α-methylandrostane-3β,17β-diol-2-carboxylic acid was purified by crystallization from methanol. The 3β-isomer was separated by chromatography.

*Example XII*

1 g. of 3-keto-17β-acetoxy-androstane-2α-carboxylic acid of Example VIII dissolved in 10 cc. of ether was treated with 6 cc. of an ether solution of diazomethane, prepared from 1.6 g. of nitrosomethylurea, adding the solution of diazomethane with stirring and in the course of a few minutes. It was kept for 15 minutes at room temperature, then acidified by addition of acetic acid and the ether was evaporated at reduced pressure. The residue was purified by recrystallization from acetone-hexane to afford the methyl ester of 3-keto-17β-acetoxy-androstane-2α-carboxylic acid, identical with the final compound of Example VIII.

*Example XIII*

Following the method of Example XII, but employing diazoethane instead of diazomethane, there was obtained the ethyl ester of 3-keto-17β-acetoxy-androstane-2α-carboxylic acid.

*Example XIV*

1 g. of 3-keto-17β-acetoxy-androstane-2α-carboxylic acid, obtained by following the method of Example VIII, was treated overnight with 50 cc. of a 1% methanolic solution of potassium hydroxide. Then it was acidified by addition of acetic acid, concentrated to small volume at reduced pressure, then poured into water and the product was extracted with ethyl acetate. The extract was washed with water, dried over anhydrous sodium sulfate and evaporated to dryness. By recrystallization of the residue there was obtained the 3-keto-17β-hydroxy-androstane-2α-carboxylic acid.

The foregoing compound was treated with diazomethane, following the method described in Example XII; there was obtained the methyl ester of 3-keto-17β-hydroxy-androstane-2α-carboxylic acid.

1 g. of the foregoing compound was dissolved in 5 cc. of pyridine, 2 cc. of propionic anhydride added, the mixture was left at room temperature overnight, then poured into water; the precipitate was filtered, washed with dilute hydrochloric acid and finally with water, dried and recrystallized from acetone to give the methyl ester of 3 - keto - 17β - propionoxy - androstane - 2α - carboxylic acid.

*Example XV*

By reaction with diazomethane, described in Example XII, there were prepared the methyl esters of 17α-methyl-3 - keto - 17β - acetoxy - androstane - 2α - carboxylic acid, 17α - methyl - 3 - keto - 17β - propionoxy - androstane - 2α - carboxylic acid, 17α - methyl - 3 - keto-17α - hydroxy - androstane - 2α - carboxylic acid, 17α-ethyl - 3 - keto - 17β - hydroxy - androstane - 2α - carboxylic acid, 17α - ethyl - 3 - keto - 17β - acetoxy - androstane - 2α - carboxylic acid and 17α - ethyl - 3 - keto-17β-propionoxy-androstane-2-carboxylic acid.

*Example XVI*

2 g. of 2α-hydroxymethyl-17β-acetoxy-19-nor-androstan-3-one was dissolved in 50 cc. of acetone; the solution was cooled to 0° C., and the air in the container was substituted by nitrogen. Then there was added little by little a solution of 8 N chromic acid, prepared from 26.7 g. of chromium trioxide and diluted sulfuric acid, little by little and with stirring at 0° C., under an atmosphere of nitrogen, until the reddish color of chromium trioxide persisted; then it was stirred under the same conditions for 10 minutes further and finally poured into ice water. The solid was filtered, washed with water, dried and recrystallized from acetone. Thus there was obtained 3-keto-17β-acetoxy-19-nor-androstane-2α-carboxylic acid.

*Example XVII*

Exactly as described in Example XVI, the 2-hydroxymethyl derivatives of 17β-propionoxy-19-nor-androstan-3-one, of 17β-capronoxy-19-nor-androstan-3-one and of 17β-cyclopentyl propionoxy-19-nor-androstan-3-one were oxidized to afford the 2α-carboxyl derivatives of the above mentioned steroids.

*Example XVIII*

Exactly as described in Example XVI there were oxidized the 2α-hydroxymethyl derivatives of 17α-methyl-19-nor-androstan-17β-ol-3-one, of 17α-ethyl-19-nor-androstan-17β-ol-3-one, as well as the 17-esters of said compounds, more specifically the acetates, propionates, caproates and cyclopentylpropionates. Thus there were obtained the 17α-methyl-3-keto-17β-hydroxy-19-nor-androstane-2α-carboxylic and the 17α-ethyl-3-keto-17β-hydroxy-19-nor-androstane-2α-carboxylic acids as well as the 17-acetate, 17-propionate, 17-caproate and 17-cyclopentylpropionate of said acids.

*Example XIX*

1 g. of 3-keto-17β-acetoxy-19-nor-androstane-2α-carboxylic acid of Example XVI dissolved in 10 cc. of ether was treated with 6 cc. of an ether solution of diazomethane, prepared from 1.6 g. of nitrosomethylurea, adding the solution of diazomethane with stirring and in the course of a few minutes. It was kept for 15 minutes at room temperature, then acidified by addition of acetic acid and the ether was evaporated at reduced pressure. The residue was purified by recrystallization from acetone hexane to afford the methyl ester of 3-keto-17β-acetoxy-19-nor-androstane-2α-carboxylic acid.

*Example XX*

Following to the method of Example XIX, but employing diazoethane instead of diazomethane, there was obtained the ethyl ester of 3-keto-17β-acetoxy-19-nor androstane-2α-carboxylic acid.

*Example XXI*

1 g. of 3-keto-17β-acetoxy-19-nor-androstane-2α-carboxylic acid, obtained by following the method of Example XVI, was treated overnight with 50 cc. of a 1% methanolic solution of potassium hydroxide. Then it was acidified by addition of acetic acid, concentrated to a small volume at reduced pressure, then poured into water and the product was extracted with ethyl acetate. The extract was washed with water, dried over anhydrous sodium sulfate and evaporated to dryness. By recrystallization of the residue there was obtained the 3-keto-17β-hydroxy-19-nor-androstane-2α-carboxylic acid.

The foregoing compound was treated with diazomethane, following the method described in Example XIX; there was obtained the methyl ester of 3-keto-17β-hydroxy-19-nor-androstane-2α-carboxylic acid.

1 g. of the foregoing compound was dissolved in 5 cc. of pyridine, 2 cc. of propionic acid was added, the mixture was left at room temperature overnight, then poured into water; the precipitate was filtered, washed with dilute hydrochloric acid and finally with water, dried and recrystallized from acetone to give the methyl ester of 3-keto - 17β - propionoxy-19-nor-androstane-2α-carboxylic acid.

*Example XXII*

By reaction with diazomethane, described in Example XIX, there were prepared from the respective acids, the methyl esters of 17α-methyl-3-keto-17β-hydroxy-19-nor-androstane-2-carboxylic acid, 17α-methyl-3-keto-17β-acetoxy-19-nor-androstane-2-carboxylic acid, 17α-methyl-3-keto - 17β - propionoxy-19-nor-androstane-2-carboxylic acid, 17α-ethyl - 3 - keto-17β-hydroxy-19-nor-androstane-2-carboxylic acid, 17α-ethyl-3-keto-17β-acetoxy-19-nor-androstane-2-carboxylic acid, and 17α-ethyl-17β-propionoxy-19-nor-androstane-2-carboxylic acid.

*Example XXIII*

A solution of 1.0 g. of 2α-hydroxymethyldihydroallotestosterone in 200 cc. of dry ether was added in 15 minutes with stirring to a suspension of 1 g. of lithium aluminum hydride in 150 cc. of dry ether. Stirring was continued for 1.5 hours and the product isolated in the usual manner. Two recrystallizations from methanol afforded pure 2α-hydroxymethyl-androstane-3β,17β-diol, M.P. 245–246° C., [α]$_D$ (CHCl$_3$) +45.9.

Pyridine-acetic anhydride acetylation of the latter compound afforded the triacetate, M.P. 162–163° C., [α]$_D$ (CHCl$_3$) —23.5.

*Example XXIV*

A solution of 5.0 g. of 2α-hydroxymethyl-17α-methyldihydroallotestosterone in 150 cc. of dry tetrahydrofuran was added dropwise with stirring in 30 minutes to a suspension of 5.0 g. of lithium aluminum hydride in 300 cc. of tetrahydrofuran. Stirring was continued for 1 hour and the product isolated in the usual manner had M.P. 275–277° C. Upon recrystallization from methanol there was afforded 2α-hydroxymethyl-17α-methyl-androstane-3β,17β-diol, M.P. 280–282° C.

*Example XXV*

By substituting in the method of Example XXIII, 2α-hydroxymethyl - 19 - nor-dihydroallotestosterone there was obtained 2α-hydroxymethyl - 19 - nor-androstane-3β,17β-diol as the main product.

Example XXVI

By substituting in the method of Example XXIV, 2α-hydroxymethyl - 17α - methyl-19-nor-dihydroallotestosterone there was afforded, as the main product, 2α-hydroxymethyl - 17α - methyl-19-nor-androstane-3β,17β-diol.

Example XXVII

A solution of 1 g. of 2α-hydroxymethyl-17α-methyl-androstane - 3β - 17β-diol, obtained as described in Example XXIV in 4 cc. of pyridine was treated with 4 cc. of acetic anhydride and the mixture kept at room temperature overnight; it was then poured into water, heated on the steam bath for 30 minutes, and the precipitate collected by filtration. Crystallization from acetone-ether gave the pure 2α-acetoxymethyl-17α-methyl-androstane-3β-17β-diol-3-acetate.

In a similar manner, 2α-hydroxymethyl-17α-methyl-19-nor-androstane-3β,17β-diol was converted into 2α-acetoxymethyl - 17α - methyl-19-nor-androstane-3β-17β-diol-3-acetate.

Example XXVIII

Following the method of the preceding example, but using propionic, caproic and cyclopentylpropionic anhydrides as esterifying agents, there were produced the corresponding 2,3 diesters of 2α-hydroxy-methyl-17α-methyl-androstane-3β-17β-diol, namely 2α-propionoxymethyl-17α-methyl-androstane - 3β - 17β-diol 3-propionate, 2α-capronoxymethyl - 17α - methyl-androstane-3β-17β-diol 3-caproate and 2α-cyclopentylpropionoxymethyl - 17α-methyl-androstane - 3β - 17β-diol 3-cyclopentylpropionate.

Example XXIX

A solution of 1 g. of 2-hydroxymethylene dihydroallotestosterone in 50 cc. of anhydrous tetrahydrofuran was slowly added to a stirred suspension of 500 mg. of lithium aluminum hydride in 50 cc. of dry ether, with cooling. The mixture was then stirred for 3 hours at room temperature, the excess of hydride was decomposed by the addition of a few drops of ethyl acetate and saturated sodium sulfate solution was added, followed by anhydrous sodium sulfate. The solids were removed by filtration and the solution was evaporated to dryness. Chromatography of the residue gave 2α-hydroxymethyl-androstane-3β-17β-diol, identical with that obtained in Example XXIII.

Upon treatment of the above compound with propionic anhydride in pyridine solution there was obtained the corresponding tripropionate.

Example XXX

In accordance with the reduction method of the preceding example, 2-hydroxymethylene-17α-methyl dihydroallotestosterone was reduced with lithium aluminum hydride thus producing 2α-hydroxymethyl-17α-methyl androstane-3β,17β-diol identical with the compound obtained in Example XXIV.

A mixture of 1 g. of the above compound, 100 cc. of anhydrous benzene, 10 cc. of acetic anhydride and 400 mg. of p-toluenesulfonic acid was stirred at room temperature for 24 hours and diluted with water; the organic layer was separated, washed with water, 5% sodium carbonate solution and again with water to neutral, dried over anhydrous sodium sulfate and evaporated. Recrystallization of the residue from acetone-hexane afforded the triester, i.e. 2α-acetoxymethyl-17α-methyl androstane-3β,17β-diol 3,17 diacetate.

Example XXXI

By following the esterification method of the preceding example, but using cyclopentyl propionic anhydride instead of acetic anhydride 500 mg. of 2α-acetoxymethyl-17α - methyl - androstane-3β-17β-diol-3-acetate was converted into 2α-acetoxymethyl-17α-methyl-androstane 3β,17β-diol 3-acetate-17-cyclopentylpropionate.

Example XXXII

An etheral solution of 1 g. of 3β,17β-dihydroxy-androstane-2α-carboxylic acid was treated with an ether solution of diazomethane in accordance with the method of Example II, and the resulting methyl ether was acetylated with acetic anhydride in pyridine solution in a conventional manner, to afford finally the 3-methyl ester of 3β,17β-diacetoxy androstane-2α-carboxylic acid.

In a similar manner, 17α-methyl androstane 3β,17β-diol-2α-carboxylic acid was converted into its corresponding methyl ester and then into the 3-methyl ester of 3β-acetoxy-17α-methyl androstan-17β-ol-2α-carboxylic acid.

I claim:

1. A compound of the following formula:

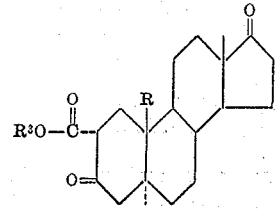

wherein R is selected from the group consisting of hydrogen and methyl and R³ is selected from the group consisting of hydrogen and lower alkyl.

2. 3,17-diketo-androstane-2α-carboxylic acid.

3. Methyl - 3,17-diketo-19-nor-androstane-2α-carboxylate.

4. Ethyl 3,17-diketo-androstane-2α-carboxylate.

5. A compound of the following formula:

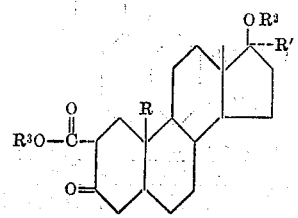

wherein R is selected from the group consisting of hydrogen and methyl, R' and R³ are each selected from the group consisting of hydrogen and lower alkyl and R² is selected from the group consisting of hydrogen and the acyl radical of a hydrocarbon carboxylic acid of less than 12 carbon atoms.

6. 3-keto-17β-hydroxy-androstane-2α-carboxylic acid.

7. 3 - keto - 17β-hydroxy-19-nor-androstane-2α-carboxylic acid.

8. 17α - lower alkyl-3-keto-17β-hydroxy-androstane-2α-carboxylic acid.

9. The 17-hydrocarbon carboxylic acid esters of less than 12 carbon atoms of 3-keto-17β-hydroxy-androstane-2α-carboxylic acid.

10. The 17-hydrocarbon carboxylic acid esters of less than 12 carbon atoms of 3-keto-17β-hydroxy-19-nor-androstane-2α-carboxylic acid.

11. The lower alkyl esters of 3-keto-17β-hydroxy-androstane-2α-carboxylic acid.

12. The lower alkyl esters of the 17-hydrocarbon carboxylic acid esters of less than 12 carbon atoms of 3-keto-17β-hydroxy-androstane-2α-carboxylic acid.

13. The 17-hydrocarbon carboxylic acid esters of less than 12 carbon atoms of 17α-lower alkyl-3-keto-17β-hydroxy-androstane-2α-carboxylic acid.

14. The lower alkyl esters of 17α-lower alkyl-3-keto-17β-hydroxy-androstane-2α-carboxylic acid.

15. The lower alkyl esters of the 17-hydrocarbon carboxylic acid esters of less than 12 carbon atoms of 17α-lower alkyl-3-keto-17β-hydroxy-androstane-2α-carboxylic acid.

16. The lower alkyl esters of the 17-hydrocarbon carboxylic acid esters of less than 12 carbon atoms of 17α- lower alkyl 3-keto-17β-hydroxy-19-nor-androstane-2α-carboxylic acid.

17. A compound of the following formula:

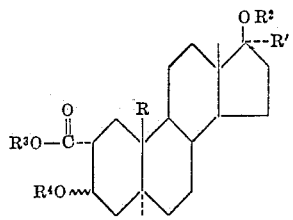

wherein R is selected from the group consisting of hydrogen and methyl, R' and R³ are each selected from the group consisting of hydrogen and lower alkyl and R² and R⁴ are selected from the group consisting of hydrogen and the acyl radical of a hydrocarbon carboxylic acid of less than 12 carbon atoms.

18. 3β,17β-dihydroxy-androstane-2α-carboxylic acid.
19. 3β,17β-dihydroxy-17α-lower alkyl-androstane-2α-carboxylic acid.
20. The hydrocarbon carboxylic acid esters of less than 12 carbon atoms of 3β,17β-dihydroxy-androstane-2α-carboxylic acid.
21. The hydrocarbon carboxylic acid esters of less than 12 carbon atoms of 3β,17β-dihydroxy-17α-lower alkyl-androstane-2α-carboxylic acid.
22. A compound of the following formula:

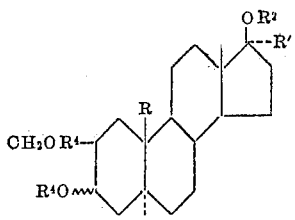

wherein R is selected from the group consisting of hydrogen and methyl; R' is selected from the group consisting of hydrogen and lower alkyl and R² and R⁴ are selected from the group consisting of hydrogen and the acyl radical of a hydrocarbon carboxylic acid of less than 12 carbon atoms.

23. 2α-hydroxymethyl-androstane-3β,17β-diol.
24. 2α-hydroxymethyl-17α-lower alkyl-androstane-3β,17β-diol.
25. 2α-hydroxymethyl-17α-methyl-androstane-3β,17β-diol.
26. The hydrocarbon carboxylic acid esters of less than 12 carbon atoms of 2α-hydroxymethyl-androstane-3β,17β-diol.

27. The hydrocarbon carboxylic acid esters of less than 12 carbon atoms of 2α-hydroxymethyl-17α-lower alkyl-androstane-3β,17β-diol.
28. A process for preparing 3,17-diketo-androstane-2α-carboxylic acid comprising oxidizing 2α-hydroxymethyl-dihydroallotestosterone with chromic acid.
29. A process for preparing 3,17-diketo-19-nor-androstane-2α-carboxylic acid comprising oxidizing 2α-hydroxymethyl-19-nor-dihydroallotestosterone with chromic acid.
30. A process for producing a compound of the following formula:

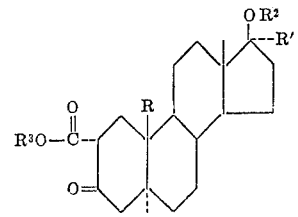

wherein R is selected from the group consisting of hydrogen and methyl, R' and R³ are each selected from the group consisting of hydrogen and lower alkyl and R² is selected from the group consisting of hydrogen and the acyl radical of a hydrocarbon carboxylic acid of less than 12 carbon atoms, comprising oxidizing with chromic acid a compound of the following formula:

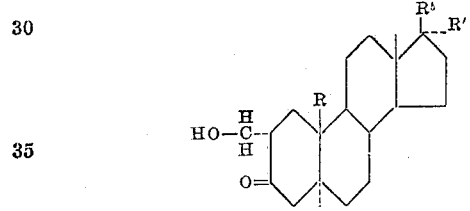

wherein R and R' have the same meaning as previously set forth and R⁵ is selected from the group consisting of hydrogen and a hydrocarbon carboxylic acyl group of less than 12 carbon atoms when R' is lower alkyl and R⁵ is a hydrocarbon carboxylic acyl group of less than 12 carbon atoms and R' is hydrogen.

31. The triacetate of 2α-hydroxymethyl-androstane-3β,17β-diol.

References Cited in the file of this patent

UNITED STATES PATENTS

| | | |
|---|---|---|
| 2,853,501 | Hoehn et al. | Sept. 23, 1958 |
| 2,883,401 | Babcock et al. | Apr. 21, 1959 |